(12) United States Patent
Horiba et al.

(10) Patent No.: US 12,320,899 B2
(45) Date of Patent: Jun. 3, 2025

(54) DISTANCE MEASUREMENT SYSTEM

(71) Applicant: TOYOTA JIDOSHA KABUSHIKI KAISHA, Toyota Aichi-ken (JP)

(72) Inventors: Kazuki Horiba, Shizuoka-ken (JP); Mitsuhiro Kinoshita, Mishima (JP); Hiroki Saito, Shizuoka-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 929 days.

(21) Appl. No.: 17/463,943

(22) Filed: Sep. 1, 2021

(65) Prior Publication Data
US 2022/0066037 A1    Mar. 3, 2022

(30) Foreign Application Priority Data

Sep. 3, 2020  (JP) .................. 2020-148353

(51) Int. Cl.
| | | |
|---|---|---|
| *G01S 17/89* | (2020.01) |
| *G01S 7/4865* | (2020.01) |
| *G01S 7/497* | (2006.01) |
| *G01S 17/08* | (2006.01) |
| *G01S 17/50* | (2006.01) |
| *G01S 17/931* | (2020.01) |

(52) U.S. Cl.
CPC ............ *G01S 17/89* (2013.01); *G01S 7/4865* (2013.01); *G01S 7/497* (2013.01); *G01S 17/08* (2013.01); *G01S 17/50* (2013.01); *G01S 17/931* (2020.01)

(58) Field of Classification Search
CPC ......... G01S 17/89; G01S 17/931; G01S 17/08
USPC ............................................................ 356/5
See application file for complete search history.

(56) References Cited

U.S. PATENT DOCUMENTS

| | | | |
|---|---|---|---|
| 11,290,673 B2 * | 3/2022 | Jin .................... | H04N 25/71 |
| 2010/0195086 A1 * | 8/2010 | Ossig .................. | G01S 7/491 |
| | | | 356/5.01 |
| 2017/0057435 A1 | 3/2017 | Park | |
| 2018/0348369 A1 | 12/2018 | Ohki | |
| 2019/0331776 A1 | 10/2019 | Aotake et al. | |

(Continued)

FOREIGN PATENT DOCUMENTS

| | | |
|---|---|---|
| DE | 10154861 A1 | 5/2003 |
| JP | 2017-044599 A | 3/2017 |

(Continued)

*Primary Examiner* — Isam A Alsomiri
*Assistant Examiner* — Kara M. Richter
(74) *Attorney, Agent, or Firm* — Dinsmore & Shohl LLP

(57) ABSTRACT

The distance measurement system includes an emitter emitting light, a receiver having a pixel array at which are formed a plurality of pixels detecting light reflected from an object, a processor configured to calculate distance data relating to a distance to the object for each of the plurality of pixels based on a result of detection of the reflected light, and use the distance data to generate a distance image, and a vehicle information detector detecting vehicle information relating to behavior of the vehicle. The processor calculates the distance data a plurality of times based on results of detection of light reflected from the object in a plurality of different time periods. The processor converts coordinates of the distance data based on the vehicle information to correct positional deviation between the distance data on the pixel array and generates the distance image for an overlapping range of the distance data.

4 Claims, 6 Drawing Sheets

(56) References Cited

U.S. PATENT DOCUMENTS

| 2020/0116867 | A1* | 4/2020 | Zhu | B60W 60/0011 |
| 2023/0204735 | A1* | 6/2023 | Lei | H04B 10/516 |
| | | | | 356/5.1 |

FOREIGN PATENT DOCUMENTS

| JP | 2017-150893 A | 8/2017 |
| JP | 2018-036145 A | 3/2018 |
| JP | 2019-191118 A | 10/2019 |

\* cited by examiner

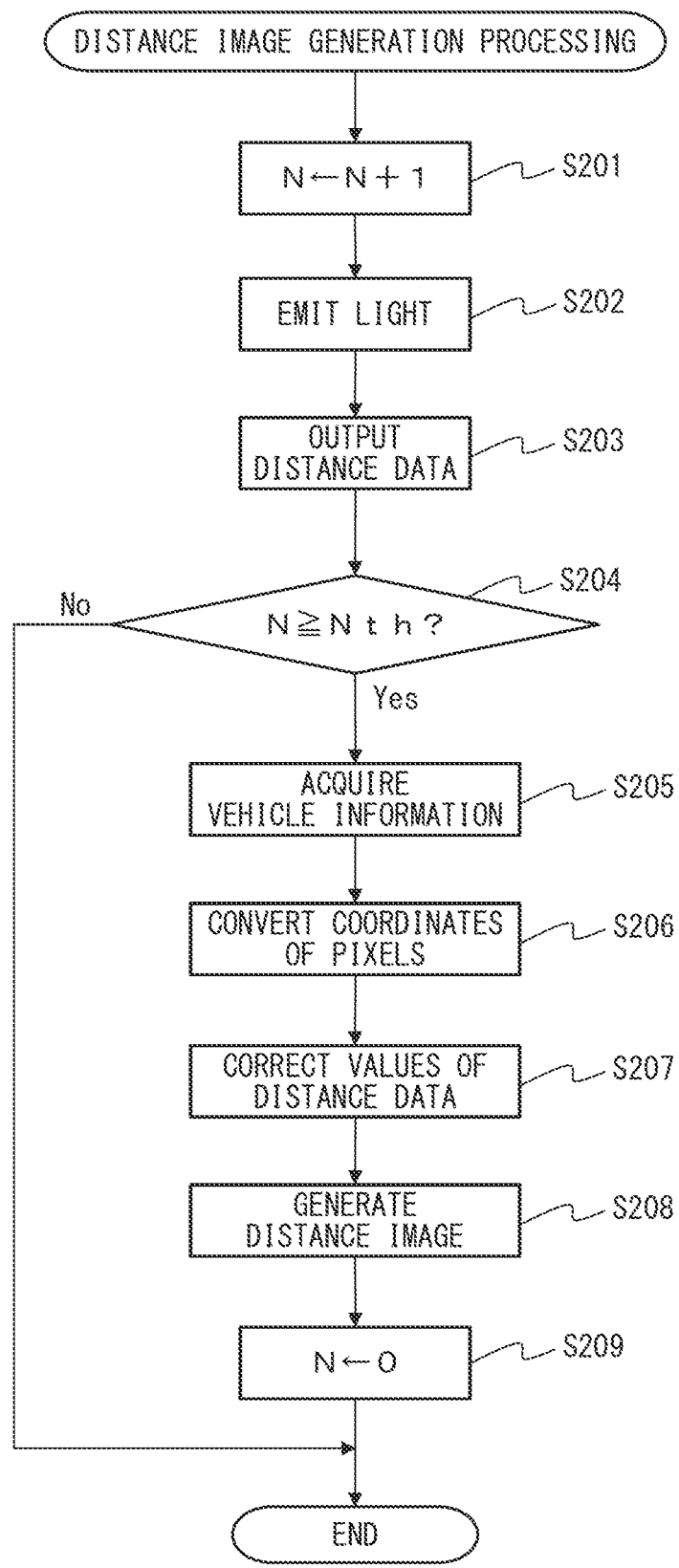

DISTANCE MEASUREMENT SYSTEM

CROSS-REFERENCE TO RELATED APPLICATIONS

This application claims priority to Japanese Patent Application No. 2020-148353 filed Sep. 3, 2020, which is incorporated herein by reference in its entirety including the specification, drawings and abstract.

FIELD

The present disclosure relates to a distance measurement system.

BACKGROUND

In the past, it has been known to use a distance measurement sensor such as a TOF sensor to detect a distance to an object (for example, Japanese Unexamined Patent Publication No. 2017-150893 and Japanese Unexamined Patent Publication No. 2019-191118).

However, if the relative distance changes between the distance measurement sensor and object during emission of the light, the precision of detection of the distance falls. As opposed to this, Japanese Unexamined Patent Publication No. 2017-150893 describes measuring the distance to an object based on the amount of reflected light received in a time period where it is judged the object is not moving.

SUMMARY

Technical Problem

In this regard, in recent years, for assisting drivers with driving etc., studies have been conducted mounting distance measurement sensors in vehicles and detecting the distances up to objects in the surroundings of the vehicles. However, usually, when a vehicle is being driven, the relative positional relationships between the vehicle and surrounding objects change. For this reason, it is difficult to apply the technique described in Japanese Unexamined Patent Publication No. 2017-150893 to a distance measurement sensor mounted in a vehicle.

Therefore, in consideration of the above problem, an object of the present disclosure is to raise the precision of detection of a distance measurement sensor mounted in a vehicle.

Solution to Problem

The summary of the present disclosure is as follows.

(1) A distance measurement system mounted in a vehicle, comprising: an emitter emitting light; a receiver having a pixel array at which are formed a plurality of pixels detecting light reflected from an object; a distance data calculating part calculating distance data relating to a distance to the object for each of the plurality of pixels based on a result of detection of the reflected light; a distance image generating part using the distance data to generate a distance image; and a vehicle information detection device detecting vehicle information relating to behavior of the vehicle, wherein the distance data calculating part calculates the distance data a plurality of times based on results of detection of light reflected from the object in a plurality of different time periods, and the distance image generating part converts coordinates of the distance data based on the vehicle information to correct positional deviation between the distance data on the pixel array and generates the distance image for an overlapping range of the distance data.

(2) The distance measurement system described in above (1), wherein the distance image generating part corrects values of the distance data based on the vehicle information and generates the distance image based on values of the distance data after correction.

(3) The distance measurement system described in above (1) or (2), wherein the emitter continuously or intermittently emits a plurality of continuous wave light beams having different modulation frequencies, and the distance data calculating part calculates the distance data corresponding to each of the different modulation frequencies.

(4) The distance measurement system described in above any one of (1) to (3), wherein the distance image generating part converts the coordinates based on coordinates in the last calculated distance data among the distance data calculated the plurality of times.

Effects of Present Disclosure

According to the present disclosure, it is possible to raise the precision of detection of a distance measurement sensor mounted in a vehicle.

BRIEF DESCRIPTION OF DRAWINGS

FIG. 7 is a flow chart showing a control routine of distance image generation processing in a second embodiment.

DESCRIPTION OF EMBODIMENTS

Figure 1:
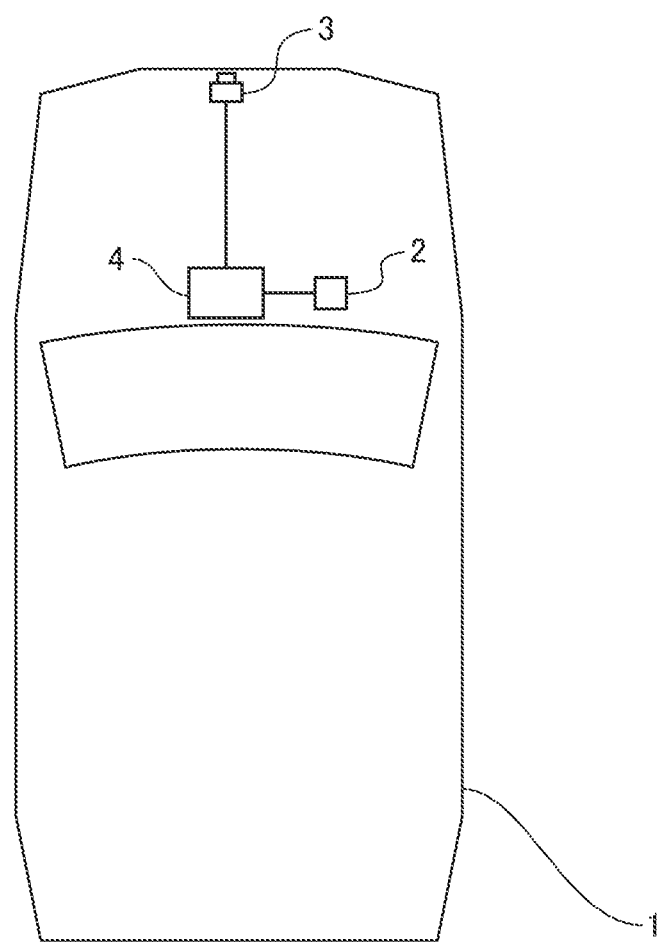
FIG. 1 is a view schematically showing a configuration of a vehicle mounting a distance measurement system according to a first embodiment of the present disclosure.

Below, referring to the drawings, embodiments of the present disclosure will be explained in detail. Note that, in the following explanation, similar component elements will be assigned the same reference notations.

First Embodiment

First, referring to FIG. 1 to FIG. 6, a first embodiment of the present disclosure will be explained.

<Configuration of Distance Measurement System>

FIG. 1 is a view schematically showing the configuration of a vehicle 1 mounting a distance measurement system according to a first embodiment of the present disclosure. The distance measurement system is provided with a vehicle information detection device 2, a TOF (time of flight) sensor 3, and an electronic control unit (ECU) 4. The vehicle information detection device 2, the TOF sensor 3, and the ECU 4 are mounted in the vehicle 1 and are connected with each other through an internal vehicle network based on the CAN (Controller Area Network) or other standard.

The vehicle information detection device 2 detects vehicle information relating to the behavior of the vehicle 1. The vehicle information includes a speed, an acceleration, a yaw rate, a current position, etc., of the vehicle 1. The vehicle information detection device 2 includes a vehicle speed sensor, a yaw rate sensor, a GPS (global positioning system) sensor, etc. The output of the vehicle information detection device 2 is sent to the ECU 4.

The ECU 4 includes a communication interface, a memory, a processor, etc., and performs various control routines of the vehicle 1. Note that, in the present embodiment, a single ECU 4 is provided, but a plurality of ECUs may be provided for the respective functions.

<Explanation of TOF Sensor>

The TOF sensor 3 emits a light beam to detect the distance from the TOF sensor 3 to an object. In the present embodiment, the TOF sensor 3 is mounted in the vehicle 1 and detects the distance from the vehicle 1 (specifically, the mounting position of the TOF sensor 3) to an object in the surroundings of the vehicle 1. The output of the TOF sensor 3 is sent to the ECU 4.

Figure 2:
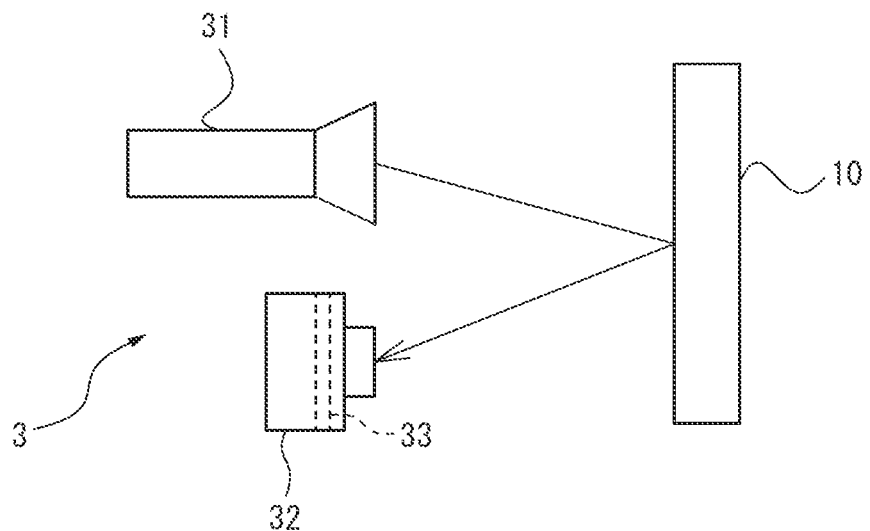
FIG. 2 is a view schematically showing a configuration of a TOF sensor.

FIG. 2 is a view schematically showing the configuration of the TOF sensor 3. The TOF sensor 3 is provided with an emitter 31 emitting light and a receiver 32 receiving light. For example, the TOF sensor 3 is arranged at a front part of the vehicle 1 (for example, a front bumper) so that the light from the emitter 31 is emitted to the front area of the vehicle 1. Note that, the TOF sensor 3 may be arranged at a back part, a side part, etc., of the vehicle 1. Further, a plurality of TOF sensors 3 may be mounted in the vehicle 1.

The emitter 31, for example, is configured as a semiconductor laser emitting near infrared laser light. The receiver 32 has a pixel array 33 at which a plurality of pixels detecting light reflected from an object 10 are formed. The plurality of pixels are arranged two dimensionally in an array on the pixel array 33. The receiver 32 is configured in the same way as for example a CMOS (complementary metal oxide semiconductor) image sensor or a CCD (charge coupled device) image sensor.

The TOF sensor 3 measures the time until light emitted from the emitter 31 is reflected at the object 10 and reaches the receiver 32, that is, the time of flight of the light, to thereby detect the distance from the TOF sensor 3 to the object 10.

Figure 3:
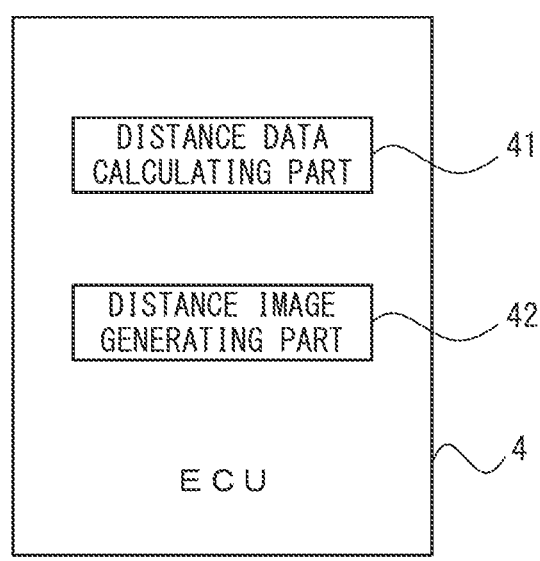
FIG. 3 is a functional block diagram of an ECU of FIG. 1.

FIG. 3 is a functional block diagram of the ECU 4 of FIG. 1. In the present embodiment, the ECU 4 has a distance data calculating part 41 and a distance image generating part 42. The distance data calculating part 41 and the distance image generating part 42 are functional modules realized by programs stored in the memory of the ECU 4 being run by the processor of the ECU 4.

The distance data calculating part 41 calculates distance data relating to a distance to an object 10 based on the result of detection of light reflected from the object 10 at the time of emitting light from the emitter 31. At this time, the reflected light is detected at each of the plurality of pixels of the pixel array 33 and the distance data calculating part 41 calculates the distance data for each of the plurality of pixels of the pixel array 33.

The distance image generating part 42 uses the distance data calculated by the distance data calculating part 41 to generate a distance image. In the distance image, the values of the distances up to an object 10 detected at the pixels are shown as pixel values of the pixels.

Figure 4:
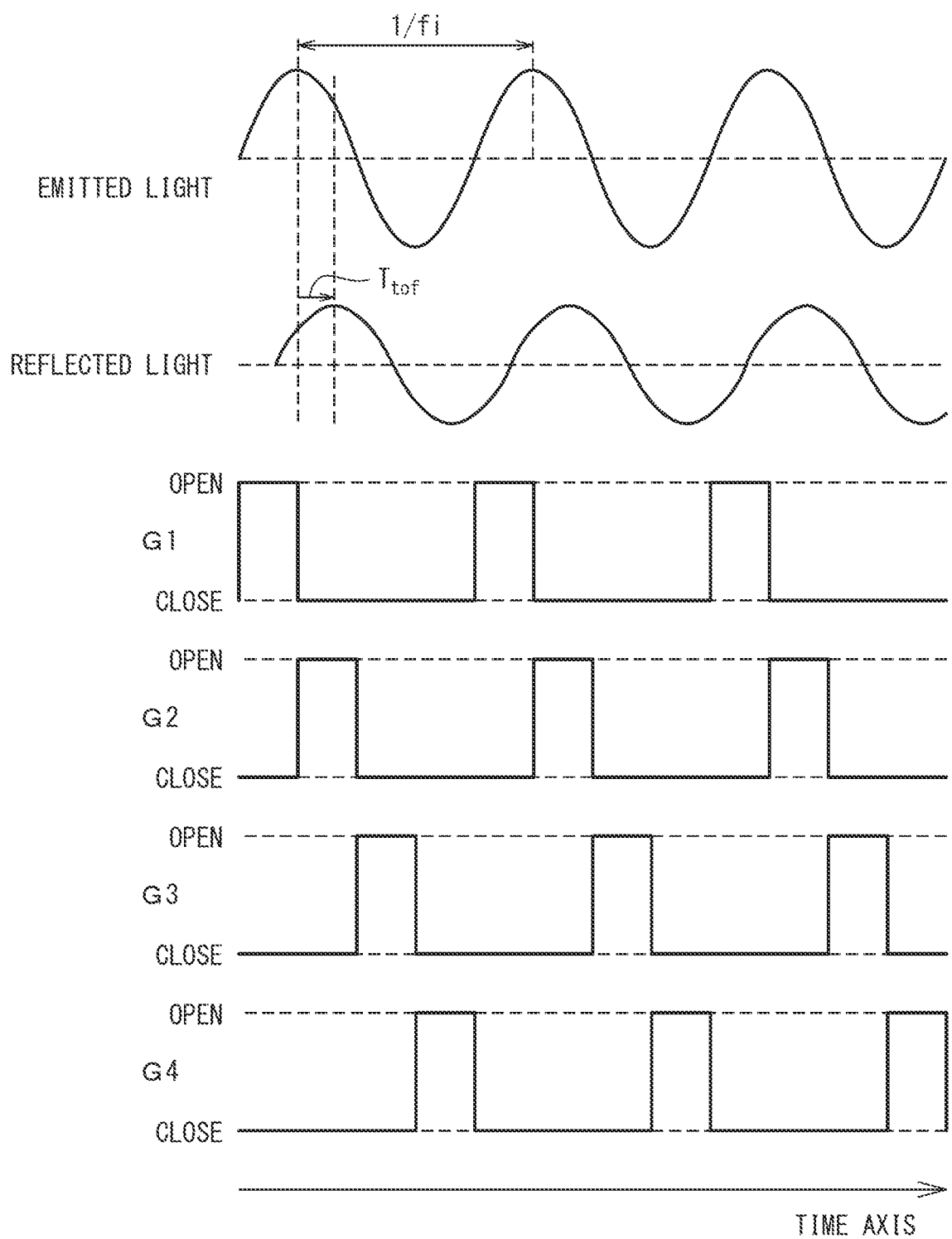
FIG. 4 is a view for explaining a principle of detection of the TOF sensor.

FIG. 4 is a view for explaining the principle of detection of the TOF sensor 3. In the present embodiment, the TOF sensor 3 is an indirect TOF (iTOF) sensor indirectly measuring the time of flight of light. Specifically, the TOF sensor 3 indirectly measures the time of flight of light based on the stored charges detected using a plurality of gates with different opening/closing timings.

In the present embodiment, as light emitted from the emitter 31, continuous wave (for example, sine wave) light is used. That is, in the present embodiment, the TOF sensor 3 is a so-called continuous wave modulation type indirect TOF sensor.

The plurality of pixels of the pixel array 33 of the receiver 32 respectively have four gates G1, G2, G3, and G4 storing charges of light received in a predetermined period. The gates G1 to G4 respectively store charges of the reflected light at the timings when the reflected light reaches the receiver 32.

The gates G1 to G4 have different time windows from each other. The opening/closing timings of the gates G1 to G4 are different from each other. The opening/closing timings of the gates G1 to G4 are, for example, set as shown in FIG. 4. Specifically, the gate G1 is open when the phase of the emitted light is from 0 to π/2 and is closed at other timings. The gate G2 is open when the phase of the emitted light is from π/2 to π and is closed at other timings. The gate G3 is open when the phase of the emitted light is from π to 3/2π and is closed at other timings. The gate G4 is open when the phase of the emitted light is from 3/2π to 2π and is closed at other timings.

The continuous wave emitted light is emitted over a predetermined time, and the charges of the light reaching the receiver 32 during emission are stored at the gates G1 to G4. The phase difference φ between the emitted light and the reflected light is calculated by the following formula (1) using the amounts of stored charge detected at the gates G1 to G4 for each of the plurality of pixels:

$$\varphi = \arctan\{(Q_1-Q_3)/(Q_2-Q_4)\} \quad (1)$$

where, $Q_1$ is the amount of stored charge detected at the gate G1, $Q_2$ is the amount of stored charge detected at the gate G2, $Q_3$ is the amount of stored charge detected at the gate G3, and $Q_4$ is the amount of stored charge detected at the gate G4.

The delay time of the reflected light, that is, the time of flight $T_{tof}$ of the light, is calculated by the following formula (2) based on the phase difference φ calculated by the above formula (1):

$$T_{tof} = \varphi/2\pi f_i \quad (2)$$

where, $f_i$ is a predetermined modulation frequency of the emitted light.

The distance L from the TOF sensor 3 to the object 10 is calculated by the following formula (3) based on the time of flight $T_{tof}$ of light calculated by the above formula (2):

$$L = T_{tof} \cdot c/2 \quad (3)$$

where, "c" is the speed of light.

In the present embodiment, the distance data calculating part 41 calculates the phase difference between the emitted light and reflected light as the distance data, while the distance image generating part 42 calculates the distance to the object 10 for each of the plurality of pixels based on the phase difference to thereby generate a distance image. Therefore, by emitting light from the emitter 31 and receiving light reflected from the object 10 using the TOF sensor 3, it is possible to generate a distance image.

However, due to the effect of the background light besides the reflected light, sometimes error arises in the detected phase difference. For this reason, in order to reduce the error and raise the precision of detection of distance, the distance data calculating part 41 calculates the distance data a plurality of times based on the results of detection of the light reflected from the object 10 in a plurality of different time periods.

In order to acquire a plurality of distance data, in the present embodiment, a plurality of continuous wave light beams having different modulation frequencies are used as the emitted light. That is, the emitter 31 continuously or intermittently emits a plurality of continuous wave light beams having different modulation frequencies. The distance data calculating part 41 calculates the distance data corresponding to each of the different modulation frequencies. For example, when there are four modulation frequencies used, the distance data calculating part 41 calculates four distance data for each of the plurality of pixels, and the distance image generating part 42 calculates the distance to the object 10 for each of the plurality of pixels based on the four distance data to generate the distance image.

Further, when the distance to the object 10 is far, there is a possibility of the delay time of the reflected light becoming longer than 1 cycle of the emitted light and the phase difference becoming larger than 2n. Even in such a case, as explained below, it is possible to identify the distance to the object 10 by using a plurality of continuous wave light beams having different modulation frequencies as the emitted light.

For example, consider the case where a continuous wave light beam having the modulation frequency $f_1$ and a continuous wave light beam having the modulation frequency $f_2$ are used as the emitted light. If $\varphi_1$ is detected as the phase difference corresponding to the modulation frequency $f_1$, considering the possibility of the phase difference being greater than $2\pi$, the distance $L_1$ to the object 10 is expressed by the following formula (4):

$$L_1 = T_{tof1} \cdot c/2 = (\varphi_1 + 2n\pi/2\pi f_1) \cdot (c/2) \quad (4)$$

Similarly, when $\varphi_2$ is detected as the phase difference corresponding to the modulation frequency $f_2$, considering the possibility of the phase difference being greater than $2\pi$, the distance $L_2$ to the object 10 is expressed by the following formula (5):

$$L_2 = T_{tof2} \cdot c/2 = (\varphi_2 + 2m\pi/2\pi f_2) \cdot (c/2) \quad (5)$$

In the above formulas (4) and (5), "n" and "m" are undetermined natural numbers. The distance $L_1$ and the distance $L_2$ when changing "n" and "m" are calculated and the distance when the difference between the distance $L_1$ and the distance $L_2$ becomes the smallest (for example, the average value of the distance $L_1$ and the distance $L_2$ at this time) is calculated as the actual distance L. Even when there are three or more modulation frequencies, the actual distance L is similarly calculated.

However, when calculating the distance data a plurality of times, the relative positional relationship between the vehicle 1 and the object 10 changes due to the change of the behavior of the vehicle 1 (change in position, change in direction, etc.) while emitting light for calculating the distance data. As a result, the position of the object 10 moves on the pixel array 33, the plurality of distance data calculated for the same pixels show different positions, and the precision of detection of the distance to the object 10 falls.

Figure 5:
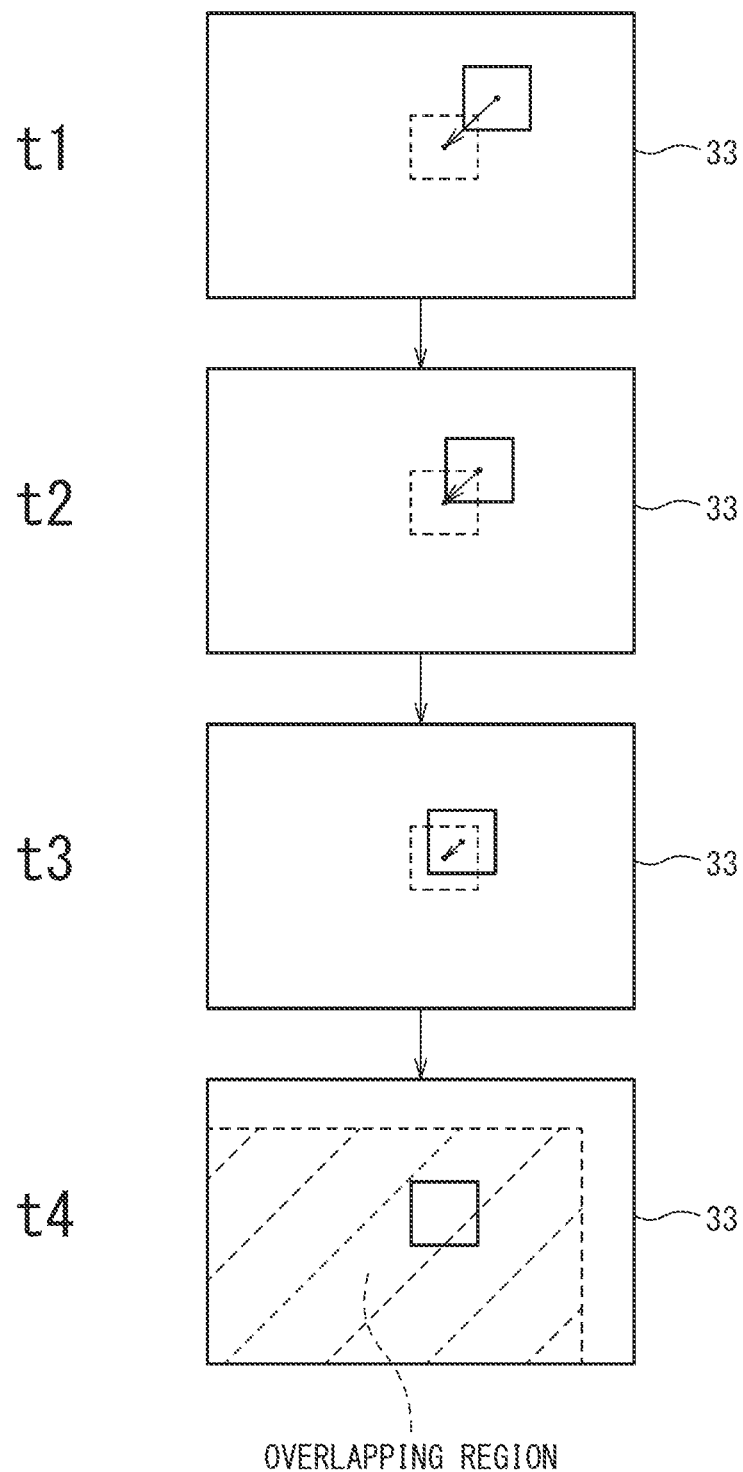
FIG. 5 is a view schematically showing an example of movement of an object on a pixel array.

FIG. 5 is a view schematically showing an example of movement of an object 10 on the pixel array 33. FIG. 5, for reference, shows by broken lines the position of the object 10 at the time t4 in the pixel array 33 from the time t1 to the time t3. Further, the range detected in the pixel array 33 from the time t1 to the time t4 is shown by hatching as the overlapping range in the pixel array 33 of the time t4.

In the example shown in FIG. 5, the object 10 moves toward the center of the pixel array 33 together with the elapse of time along with a change in the behavior of the vehicle 1. That is, between the time t1 to the time t4, deviation occurs in the range of measurement on the pixel array 33. In such a case, the positions detected by the same pixels at different times differ, and therefore if the distance data of the same pixels is used to calculate distance, the precision of detection will fall.

Therefore, in the present embodiment, the distance image generating part 42 converts the coordinates of a plurality of pixels based on the vehicle information to correct the positional deviation between distance data on the pixel array 33 and generate a distance image for the overlapping range of the distance data. By doing this, it is possible to decrease the effect due to change of the behavior of the vehicle 1 and in turn possible to raise the precision of detection of the TOF sensor 3.

For example, the distance image generating part 42 calculates the amount of movement of the object 10 on the pixel array 33 based on the vehicle information and converts the coordinates of a plurality of pixels so that the coordinates (x, y) of the pixels which detect light reflected from the same positions at different time periods become the same.

At this time, in the present embodiment, the distance image generating part 42 converts the coordinates based on the coordinates in the last calculated distance data among the distance data calculated a plurality of times. Due to this, it is possible to generate a distance image based on the last position of the object 10 and in turn possible to detect the latest position of the object 10 with good precision.

Specifically, the distance image generating part 42 converts the coordinates of the plurality of pixels relating to the distance data calculated other than last to the coordinates of the plurality of pixels relating to the last calculated distance data, respectively. For example, for the pixels detecting the center of the object 10 at the time t1 to the time t3 of FIG. 5, the coordinates are converted as shown by the arrow marks. The coordinates after coordinate conversion of the pixels detecting positions not detected at the time t4 become outside the range of the pixel array 33. The coordinates after the coordinate conversion of the pixels detecting the positions detected at the time t4 become within the range of the pixel array 33. Therefore, the overlapping range of the distance data is identified by the coordinate conversion.

<Distance Image Generation Processing>

Figure 6:
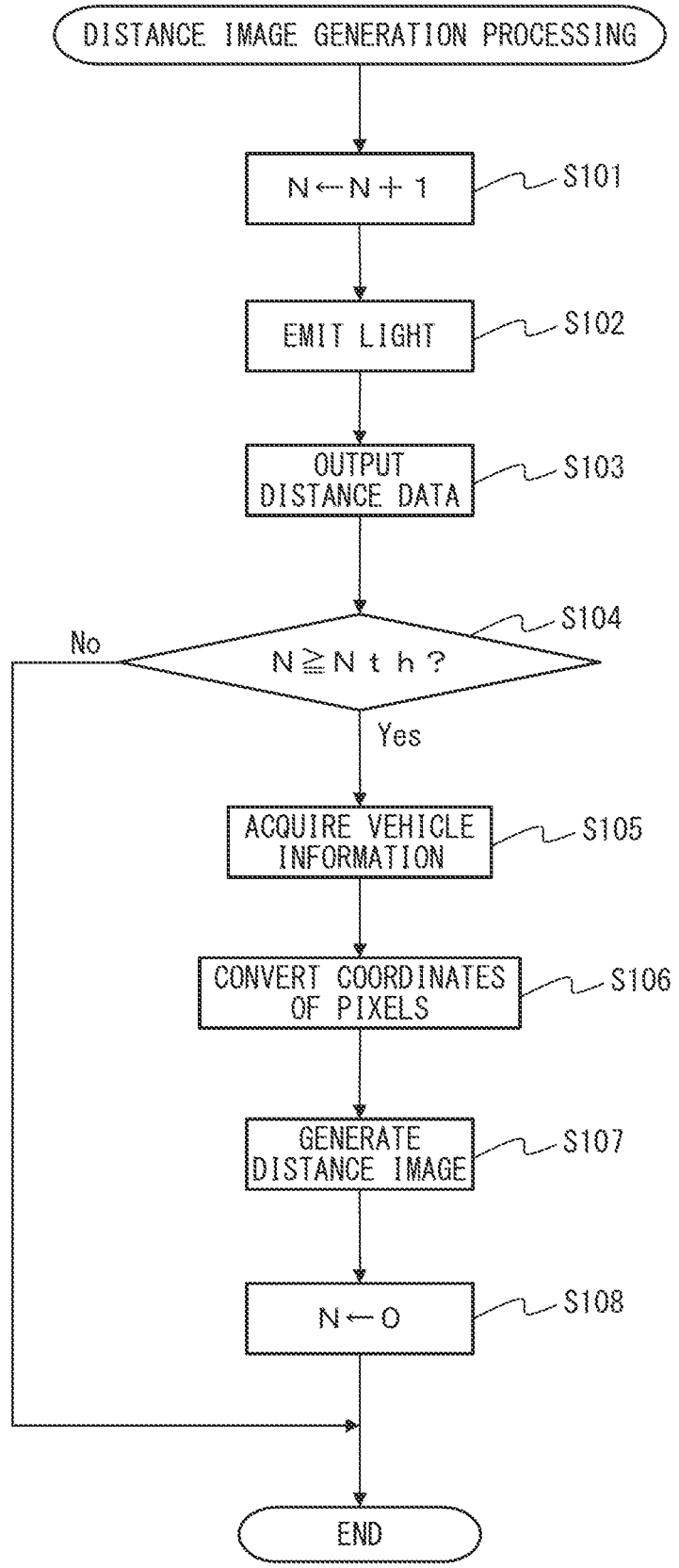
FIG. 6 is a flow chart showing a control routine of distance image generation processing in the first embodiment.

Below, referring to the flow chart of FIG. 6, the abovementioned control will be explained in detail. FIG. 6 is a flow chart showing a control routine of distance image generation processing in the first embodiment. The present control routine is repeatedly performed at predetermined intervals by the ECU 4.

First, at step S101, the distance data calculating part 41 adds 1 to the number of times of calculation N to update the number of times of calculation N. The number of times of calculation N show the number of times the distance data is calculated for each of the plurality of pixels. The initial value of the number of times of calculation N is zero.

Next, at step S102, the distance data calculating part 41 makes the emitter 31 emit light for a predetermined time period. Specifically, the distance data calculating part 41 makes the emitter 31 emit continuous wave light having a predetermined modulation frequency $f_N$ for a predetermined time period. The modulation frequency $f_N$ is set to a different value in accordance with the value of the number of times of calculation N.

Next, at step S103, the distance data calculating part 41 calculates the distance data based on the results of detection of the reflected light for each of the plurality of pixels. Specifically, the distance data calculating part 41 calculates the phase difference $\varphi_N$ between the emitted light and reflected light by the above formula (1) based on the amounts of stored charge detected at the gates G1 to G4 in a predetermined time period during which light is emitted. The plurality of pixels are respectively assigned coordinates (x, y). The phase difference $T_N$ for each of the plurality of pixels is temporarily stored together with the coordinates of the corresponding pixels in the memory of the ECU 4 or another storage device of the vehicle 1.

Next, at step S104, the distance image generating part 42 judges whether the number of times of calculation N is equal to or greater than a predetermined value Nth. The predetermined value Nth is a whole number of 2 or more, for example, is 4. If it is judged that the number of times of calculation N is less than the predetermined value Nth, the present control routine is ended. On the other hand, if it is judged that the number of times of calculation N is equal to or greater than a predetermined value Nth, the present control routine proceeds to step S105.

At step S105, the distance image generating part 42 acquires vehicle information during the period of emission of light. The vehicle information is detected by the vehicle information detection device 2 during the period of emission of light and is temporarily stored in the memory of the ECU 4 or another storage device of the vehicle 1.

Next, at step S106, the distance image generating part 42 converts the coordinates of the distance data based on the vehicle information. First, the distance image generating part 42 estimates the changes in the behavior of the vehicle 1 while emitting light (changes of positions, changes of directions, etc.) based on the vehicle information using calculation formulas, maps, etc., and calculates the amounts of change of the coordinates (x, y) of the pixels corresponding to the change of the behavior of the vehicle 1. Next, the distance image generating part 42 uses the amount of change of the coordinates calculated to convert the coordinates of the distance data based on the coordinates in the last calculated distance data among the distance data calculated a plurality of times. That is, the distance image generating part 42 converts the coordinates for the distance data with a number of times of calculation N less than Nth.

Next, at step S107, the distance image generating part 42 generates a distance image for the overlapping range of distance data, that is, the range of pixels where the coordinates after coordinate conversion are within the range of the pixel array 33. Specifically, the distance image generating part 42 uses the plurality of distance data of the pixels with equal coordinates after coordinate conversion to calculate the distances corresponding to the pixels and displays the values of the distances as pixel values to generate a distance image.

Next, at step S108, the distance image generating part 42 resets the number of times of calculation N to zero. After step S108, the control routine ends.

Second Embodiment

The configuration and control of the distance measurement system according to the second embodiment are basically similar to the configuration and control of the distance measurement system according to the first embodiment except for the points explained below. For this reason, below, the second embodiment of the present disclosure will be explained centered on parts different from the first embodiment.

As explained above, if calculating the distance data a plurality of times, the relative positional relationship between the vehicle 1 and the object 10 changes due to the changes of the behavior of the vehicle 1 (changes in position, changes in direction, etc.) while emitting light for calculating the distance data. For this reason, while emitting light, that is, while detecting reflected light, not only the position of the object 10 on the pixel array 33, but also the distance from the vehicle 1 to the object 10 is liable to change.

For this reason, in the second embodiment, the distance image generating part 42 corrects the value of the distance data based on the vehicle information and generates the distance image based on the values of the distance data after correction. By doing this, it is possible to decrease the effect due to the distance data at the different timings showing different distances for the same positions and in turn possible to raise the precision of detection of the TOF sensor 3 much more.

<Distance Image Generation Processing>

Below, referring to the flow chart of FIG. 7, the above-mentioned control will be explained in detail. FIG. 7 is a flow chart showing a control routine of the distance image generation processing in the second embodiment. The control routine is repeatedly performed at predetermined intervals by the ECU 4.

Steps S201 to S206 are performed in the same way as steps S101 to S106 of FIG. 6.

After step S206, at step S207, the distance image generating part 42 corrects the value of the distance data based on the vehicle information. First, the distance image generating part 42 estimates the changes in the behavior of the vehicle 1 in the time period of emission of light (changes in position, changes in direction, etc.) based on the vehicle information using the calculation formula, map, etc., and calculates the amount of change of the distance corresponding to the change of the behavior of the vehicle 1. Next, the distance image generating part 42 converts the amount of change of the distance calculated to the amount of change of the distance data (in the present embodiment, difference in phase of the emitted light and reflected light) and adds the amount of change of the distance data for the overlapping range of the distance data. At this time, the distance image generating part 42 corrects the distance data based on the last calculated distance data among the distance data calculated the plurality of times. That is, the distance image generating part 42 adds the amount of change of the distance data to the distance data with a number of times of calculation N of less than Nth.

Next, at step S208, the distance image generating part 42 generates an distance image for the overlapping range of distance data, that is, the range of pixels with coordinates after coordinate conversion within the range of the pixel array 33. Specifically, the distance image generating part 42 uses the values after correction of the distance data of the pixels with equal coordinates after coordinate conversion to calculate the distances corresponding those pixels and displays the values of the distances as pixel values to generate a distance image.

Next, at step S209, the distance image generating part 42 resets the number of times of calculation N to zero. After step S209, the present control routine is ended.

Above, embodiments according to the present disclosure were explained, but the present disclosure is not limited to these embodiments and can be corrected and changed in various ways within the language of the claims.

For example, the emitter 31 may continuously or intermittently emit a plurality of continuous wave light beams having the same modulation frequency. That is, at step S102 of FIG. 6 and step S202 of FIG. 7, the modulation frequency $f_N$ may be set to the same value regardless of the value of the number of times of calculation N.

Further, the TOF sensor 3 may be an indirect TOF (iTOF) sensor of the pulse modulation type indirectly measuring the delay time (time of flight of light) of the reflected light based on the stored charges when the emitter 31 emits light pulses. Further, the TOF sensor 3 may be a direct TOF (dTOF) sensor such as a flash type LIDAR directly measuring the delay time (time of flight of light) using the pixel array 33 of the receiver 32. In these cases, the distance data calculating part 41 calculates the delay time of the reflected light as the distance data relating to the distance to the object 10, and the distance image generating part 42 calculates the distance to the object 10 based on the average value of the delay times calculated the plurality of times for each of the plurality of pixels.

Further, the TOF sensor 3 may generate a luminance image (contrast image) as generated by the camera in addition to the distance image. Further, instead of the ECU 4, a processor housed in the TOF sensor 3 etc., may function as the distance data calculating part 41 and the distance image generating part 42.

REFERENCE SIGNS LIST 1 vehicle
2 vehicle information detection device
3 TOF sensor
31 emitter
32 receiver
33 pixel array
4 electronic control unit (ECU)
41 distance data calculating part
42 distance image generating part

The invention claimed is:

1. A distance measurement system mounted in a vehicle, comprising:
an emitter emitting light;
a receiver having a pixel array at which are formed a plurality of pixels detecting light reflected from an object;
a processor configured to calculate distance data relating to a distance to the object for each of the plurality of pixels based on a result of detection of the reflected light, and use the distance data to generate a distance image; and
a vehicle information sensor detecting vehicle information relating to motional behavior of the vehicle, wherein:
the processor is configured to calculate the distance data a plurality of times based on results of detection of light reflected from the object in a plurality of different time periods,
the processor is configured to convert coordinates of the distance data based on the vehicle information to correct positional deviation between the distance data on the pixel array and generate the distance image for an overlapping range of the distance data,
the processor is configured to calculate a phase difference between the emitted light and the reflected light based on an amount of stored charged detected at a gate in a predetermined time period during which light is emitted,
the processor is configured to determine whether the number of times of calculation is equal to or greater than a predetermined value,
the processor is configured to estimate a change in the motional behavior of the vehicle while emitting light based on the vehicle information and calculate an amount of change of the coordinates of the plurality of pixels corresponding to the change of the motional behavior of the vehicle,
the processor is configured to convert the coordinates for the distance data with the number of times of calculation less than the predetermined value,
the plurality of pixels of the pixel array of the receiver respectively include one or more gates storing charges of light received in a predetermined time period, and
each of the one or more gates include different time windows from each other to open and close.

2. The distance measurement system according to claim 1 wherein the processor is configured to correct values of the distance data based on the vehicle information and generate the distance image based on values of the distance data after correction.

3. The distance measurement system according to claim 1, wherein the emitter continuously or intermittently emits a plurality of continuous wave light beams having different modulation frequencies, and the processor is configured to calculate the distance data corresponding to each of the different modulation frequencies.

4. The distance measurement system according to claim 1, wherein the processor is configured to convert the coordinates based on coordinates in a previous calculated distance data among the distance data calculated the plurality of times.

* * * * *